United States Patent
Dunipace (10) Patent No.: US 8,971,069 B2
(45) Date of Patent: Mar. 3, 2015

(54) STARTUP CIRCUIT AND INPUT CAPACITOR BALANCING CIRCUIT

(75) Inventor: Richard A. Dunipace, Highland Village, TX (US)

(73) Assignee: Fairchild Semiconductor Corporation, San Jose, CA (US)

( * ) Notice: Subject to any disclaimer, the term of this patent is extended or adjusted under 35 U.S.C. 154(b) by 227 days.

(21) Appl. No.: 13/347,616

(22) Filed: Jan. 10, 2012

(65) Prior Publication Data

US 2012/0176821 A1    Jul. 12, 2012

Related U.S. Application Data

(60) Provisional application No. 61/431,723, filed on Jan. 11, 2011, provisional application No. 61/372,793, filed on Aug. 11, 2010.

(51) Int. Cl.
*H02M 1/36* (2007.01)
*H02J 7/00* (2006.01)

(52) U.S. Cl.
CPC .............. *H02M 1/36* (2013.01); *H02J 7/0014* (2013.01)
USPC ............................................. 363/49; 361/328

(58) Field of Classification Search
USPC ...................... 361/328–329; 363/49; 323/901; 320/166–167
See application file for complete search history.

(56) References Cited

U.S. PATENT DOCUMENTS

| 5,682,022 A * | 10/1997 | Schroder-Brumloop et al. ............................. 187/290 |
| 6,738,277 B2 * | 5/2004 | Odell ............................ 363/143 |
| 2003/0214267 A1 * | 11/2003 | Long ............................... 320/116 |
| 2008/0007891 A1 * | 1/2008 | Doljack ......................... 361/502 |

OTHER PUBLICATIONS

IBM Technical Disclosure Bulletin NB84092320, Capacitive Start-Up Circuit for Switching Power Supply, Sep. 1, 1984, vol. 27, Issue No. 4B, p. 2320.*

* cited by examiner

*Primary Examiner* — Harry Behm
(74) *Attorney, Agent, or Firm* — Okamoto & Benedicto LLP (57) ABSTRACT

In one embodiment, an input capacitor balancing circuit for a power supply is provided. The circuit includes an input capacitance operable to filter input power for the power supply. The input capacitance has a first capacitor and a second capacitor coupled in series between an input voltage and a first node. A voltage divider circuit is coupled to the input voltage and operable to generate a divided voltage therefrom. A buffer circuit is operable to receive the divided voltage and, if the first capacitor and the second capacitor are not balanced, to provide current to the input capacitance to balance the first capacitor and the second capacitor.

13 Claims, 10 Drawing Sheets

STARTUP CIRCUIT AND INPUT CAPACITOR BALANCING CIRCUIT

CROSS-REFERENCE TO RELATED APPLICATION AND CLAIM OF PRIORITY

The present application claims the benefit of priority to U.S. Provisional Patent Application Ser. No. 61/431,723, filed Jan. 11, 2011, entitled, "Startup Circuit and Input Capacitor Balancing Circuit," and is related to U.S. patent application Ser. No. 13/207,798, filed Aug. 11, 2011, now U.S. Pat. No. 8,638,575, issued on Jan. 28, 2014, entitled, "High Voltage Startup Circuit," which claims the benefit of priority to U.S. Provisional Patent Application Ser. No. 61/372,793, filed Aug. 11, 2010, entitled, "High Voltage Startup Circuit and High Voltage Input Capacitor Balancing Circuit," the entirety of which is incorporated by reference herein.

BACKGROUND

Field of Invention

Power converters are essential for many modern electronic devices. Among other capabilities, a power converter can adjust voltage level downward (buck converter and its derivatives) or adjust voltage level upward (boost converter and its derivatives). A power converter may also convert from alternating current (AC) power to direct current (DC) power, or vice versa. A power converter may also function to provide an output at a regulated level (e.g., 5.0V or 5 amps). Power converters are typically implemented using one or more switching devices, such as transistors, which are turned on and off to deliver power to the output of the converter. Control circuitry is provided to regulate the turning on and off of the switching devices, and thus, these converters are known as "switching regulators" or "switching converters." Such a power converter may be incorporated into or used to implement a power supply—i.e., a switching mode power supply (SMPS). The power converter may also include one or more capacitors or inductors for alternately storing and delivering energy.

Power supplies, and controllers for the same, are used in many applications. Off-line low voltage applications are in the range of 85VAC to 265VAC which correspond to standard line voltages, e.g., for the United States, Europe, Asia, etc. High voltage (HV) applications can be anything above 265V, such as, for example, industrial power supplies (requiring up to 600V AC input), bias supplies for windmills (requiring up to 1000V AC inputs), solar panels (requiring "string" converters that can operate to 800V to 1000V DC input), ballasts (which can operate from approximately 85V AC to more than 480V AC), power factor pre-regulators in industrial lighting applications, and "smart meters" (that can operate on inputs ranging from around 85V to 576V AC or approximately 120V to 820V DC).

Meters for monitoring (e.g., electricity usage) can require power supplies ranging between 1 W and 15 W. Non-smart meters use power supplies of around 1 W. A "smart meter," which can be a meter having a communications link to a central location to monitor and control electricity usage, typically uses higher power levels, for example, ranging between 5 W and 7 W during transmission.

Smart meters enable two-way communications between electric utilities and both consumer and business power users to attempt to improve delivery efficiency and the ability to control and regulate overall power consumption. They are part of the "Smart Grid" technology initiative.

A smart meter can include a power supply, a controller for the power supply, an input for receiving power (e.g., AC source), a measurement section, and a communications section. The communications section typically includes a radio-frequency (RF) subsection which receives and/or transmits RF signals to/from a meter reader, other meters (e.g., gas or water), or electrical appliances (e.g., refrigerator). A smart meter should be able to withstand up to 6000V transients at AC input. Furthermore, a smart meter can be used in or exposed to a wide range of applications (e.g., from 85V to 900V). For this, all components at the front-end of the smart meter typically must be rated for this wide range or arranged in a certain way.

Specifications for smart meters allow continuous transmission so the power supplies need to be dimensioned for this higher power level. In addition, there are some special meters with power levels of over 15 W. Power supplies for meters can provide single outputs: 27 to 12 volts (or so), or dual outputs: 27 to 12V (or so) and 5V/3.3V. These power supplies are generally implemented using non-isolated flyback converters, but sometimes using buck or isolated flyback converters.

All power supply controllers need to be started when a sufficient input voltage is present in order to drive the first pulses to energize the power supply controller. In low voltage applications, the controller can simply be connected to the rectified standard line voltage. For other applications such as those above 265V, a controller may typically include a high voltage (HV) startup pin or terminal and related circuitry which are connected to receive and convert the HV power to the levels required by the controller.

SUMMARY

Briefly and generally, embodiments of the invention include a high voltage input capacitor balancing circuit which can also be used as, or combined with, a high voltage startup circuit. It is possible to use both features in the same power supply. The startup and input capacitor balancing circuitry can be used in a wide range of applications, including low and high voltage applications. Embodiments of the invention also include power supplies having the start-up and input capacitor balancing circuitry. Further embodiments of the invention include a system (such as, a smart meter) incorporating such a power supply.

In one embodiment, an input capacitor balancing circuit for a power supply is provided. The circuit includes an input capacitance operable to filter input power for the power supply. The input capacitance has a first capacitor and a second capacitor coupled in series between an input voltage and a first node. A voltage divider circuit is coupled to the input voltage and operable to generate a divided voltage therefrom. A buffer circuit is operable to receive the divided voltage and, if the first capacitor and the second capacitor are not balanced, to provide current to the input capacitance to balance the first capacitor and the second capacitor.

In another embodiment, an input capacitor balancing circuit for a power supply is provided. The circuit includes M input capacitors coupled in series between an input voltage and a first node. The M input capacitors are operable to filter input power for the power supply. A voltage divider circuit is coupled to the input voltage and operable to generate a plurality of divided voltages therefrom. M-1 buffer circuits are each coupled to a respective common connection between respective two of the M input capacitors. Each of the M-1 buffer circuits is operable to receive a respective divided voltage from the voltage divider circuit and, if the respective two of the M input capacitors are not balanced, to provide current to balance the respective two of the M input capacitors.

In yet another embodiment, an input capacitor balancing circuit for a power supply is provided. The circuit includes an input capacitance operable to filter input power for the power supply. The input capacitance has a first capacitor and a second capacitor coupled in series between an input voltage and a first node. A voltage divider circuit is coupled to the input voltage and operable to generate a divided voltage therefrom. An operational amplifier circuit is operable to receive the divided voltage and, if the first capacitor and the second capacitor are not balanced, to provide current to the input capacitance to balance the first capacitor and the second capacitor.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1A through 7 of the drawings. In general, like numerals are used for like and corresponding parts of the various drawings.

High Voltage Input Capacitor Balancing Circuit

Power supplies (e.g., SMPSs) may have one or more capacitors to filter the input power. Power supplies with inputs greater than 450V DC typically use stacked electrolytic capacitors for the input filter. These capacitors can introduce problems. All capacitors have leakage current. The leakage of the capacitors can be significant and varies from capacitor to capacitor initially, and over time and temperature. The unbalanced capacitor leakage produces different voltages across the stacked capacitors which can lead to premature failure.

The typical way to balance the voltage across stacked capacitors is to put balancing resistors across each capacitor. The voltage divides according to the ratio of the resistors. The resistor bleed currents are selected to be at least 10 times the expected worst-case capacitor leakage currents over time and temperature. This in itself is problematic because the bleed currents can be substantial, significantly increasing power supply power consumption. More specifically, under normal working conditions, the balance resistances dissipate a significant amount of power. However, if the resistances can be set high enough, the power dissipation can be managed. The typical value for such resistors is 200K ohm across each capacitor assuming the input capacitor values are below 33 uF at 450V. Two resistors are typically used in series to realize the 200K ohms to obtain adequate voltage breakdown. Thus, each resistor can be approximately 100K ohms Larger capacitor values and higher operating temperatures produce higher leakage currents through the capacitors and require lower resistor values to compensate. Unfortunately, the power lost via the balancing resistors is meaningful even under ideal conditions and maximum power output. This issue can be aggravated by wide input voltage range power supplies where input voltages can range from 60 to over 1400 volts.

To address or reduce this problem, a high voltage input capacitor balancing circuit, according to some embodiments, functions to balance the input capacitors without the need for balancing resistors. In some embodiments, the high voltage input capacitor balancing circuit may be used to provide the current for the power supply controller, or combined with a high voltage startup circuit to provide startup voltage (e.g., startup VCC) to controllers with HV startup capabilities. The resistive divider losses can be reduced by up to 90% by actively driving the capacitor.

Smart meter supplies are sized based upon worst-case power requirements. Smart meters draw most power during transmission/reception. Non-transmission power requirements (standby power) could be 10% or less of the maximum. During standby, fixed loads such as the input capacitor bleed resistors can be a substantial percentage of all power supply current; thus, representing a significant loss during standby. Meters in many applications are run in standby most of their operating time. To maximize meter efficiency, a method needs to be employed to minimize capacitor balancing overhead power costs during standby.

Figure 1A:
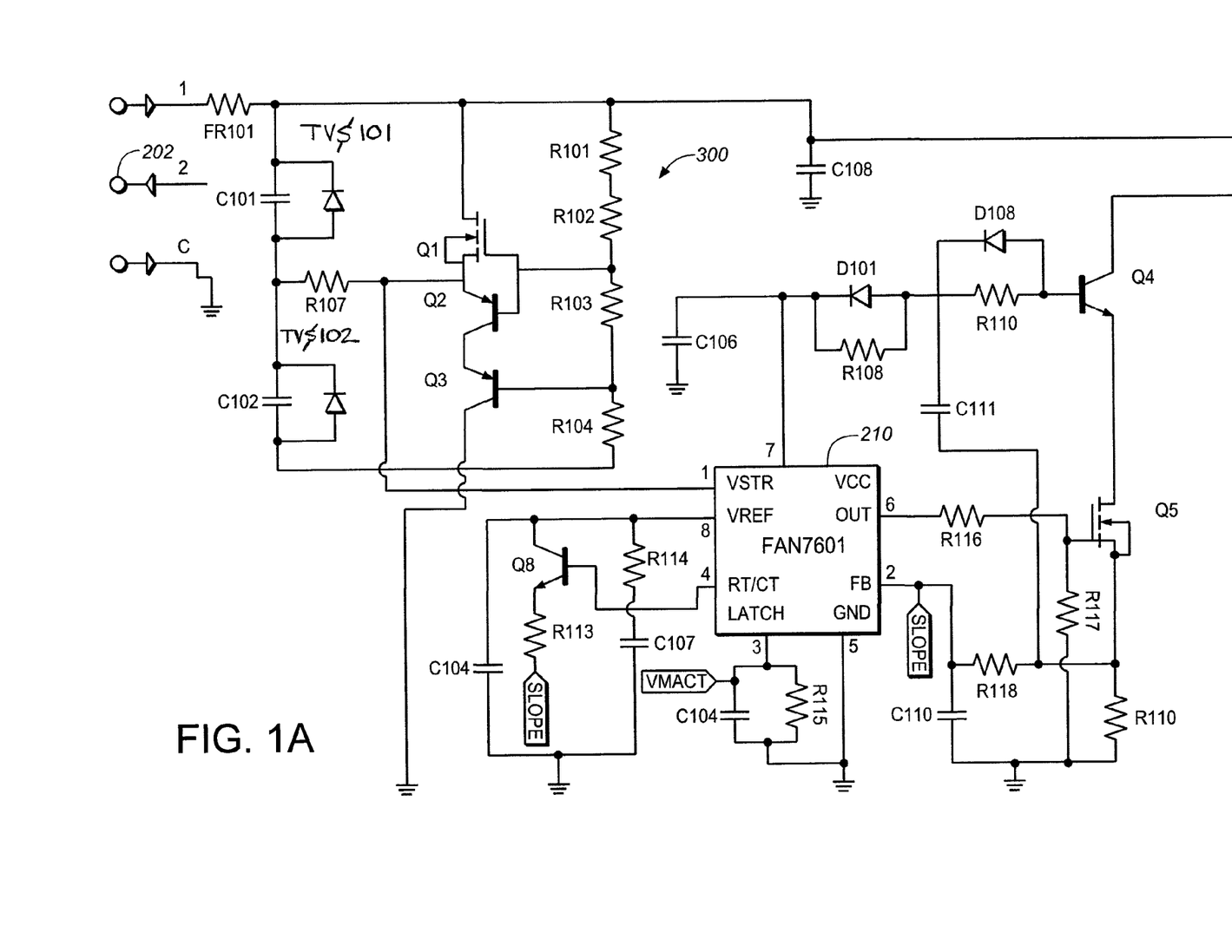
FIGS. 1A and 1B, collectively, are a schematic diagram of an exemplary implementation of a power supply with an input capacitor balancing circuit that also provides controller startup.
Figure 1B:
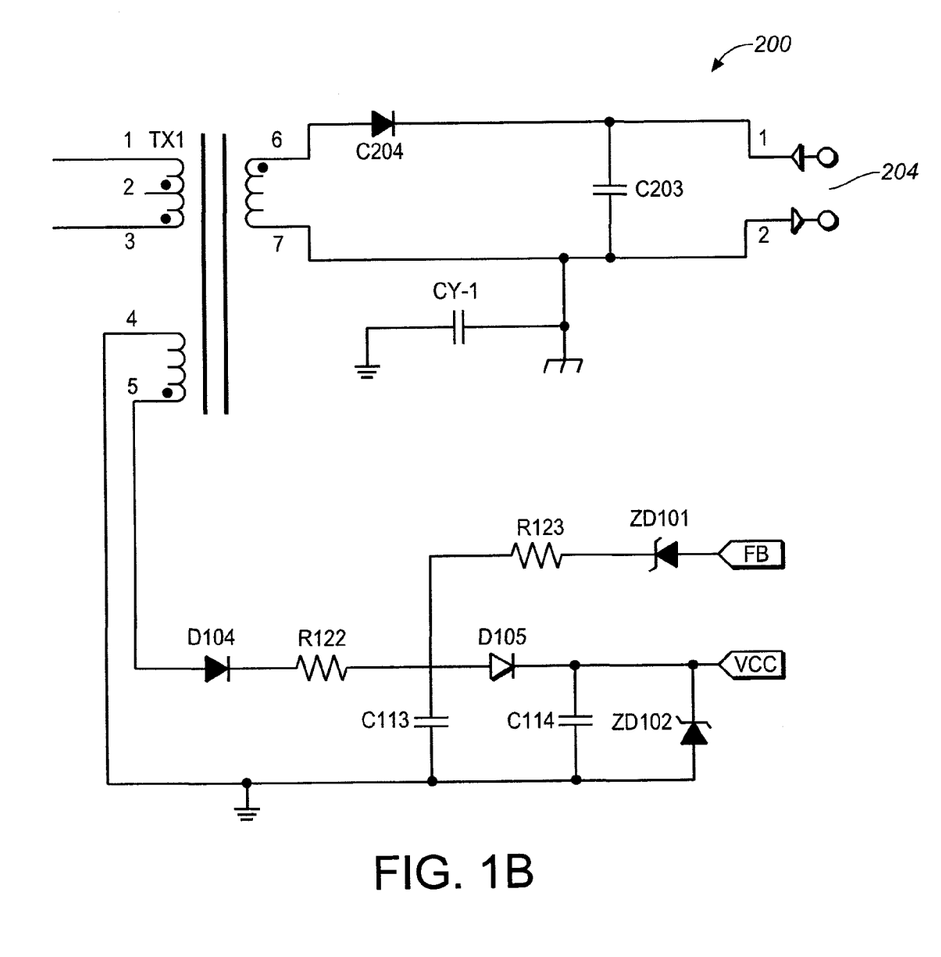

FIGS. 1A and 1B, collectively, are a schematic diagram of an exemplary implementation of a power supply 200 according to an embodiment of the invention. Such power supply 200 could be used or incorporated in devices, such as, for example, a smart meter, that are subject to, or used in a wide range of applications, from low voltage to high voltage. The power supply 200 can be connected to a power source at an input terminal and operate with a wide range of input voltages, for example, approximately 60V to 850V DC. The power supply 200 provides power for the device (e.g., smart meter) at an output terminal.

Power supply 200 includes a switching controller 210 and a high voltage input capacitor balancing circuit 300. In one embodiment, switching controller 210 can be implemented with a suitable controller having an HV input pin, such, for example, a FAN 7601 switching controller available from Fairchild Semiconductor Corp. The high voltage input capacitor balancing circuit 300 can be implemented in a number of ways.

Figure 2:
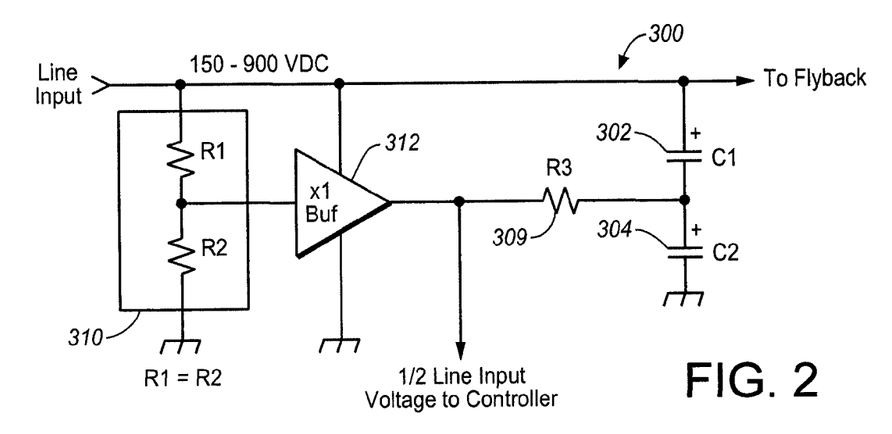
FIG. 2 is a partial block diagram of an exemplary implementation of a high voltage input capacitor balancing circuit for a power supply.

FIG. 2 is a schematic diagram of an exemplary implementation of high voltage input capacitor balancing circuit 300 according to an embodiment of the invention. High voltage input capacitor balancing circuit 300 can provide active balance for a two input capacitor configuration (capacitors 302 and 304 (also labeled as C1 and C2, respectively)) used as an input filter for a power supply. A resistor 309 (also labeled as R3) limits the drive current to capacitors 302 and 304 given worst-case capacitance value imbalance and input voltage ripple.

Figure 5A:
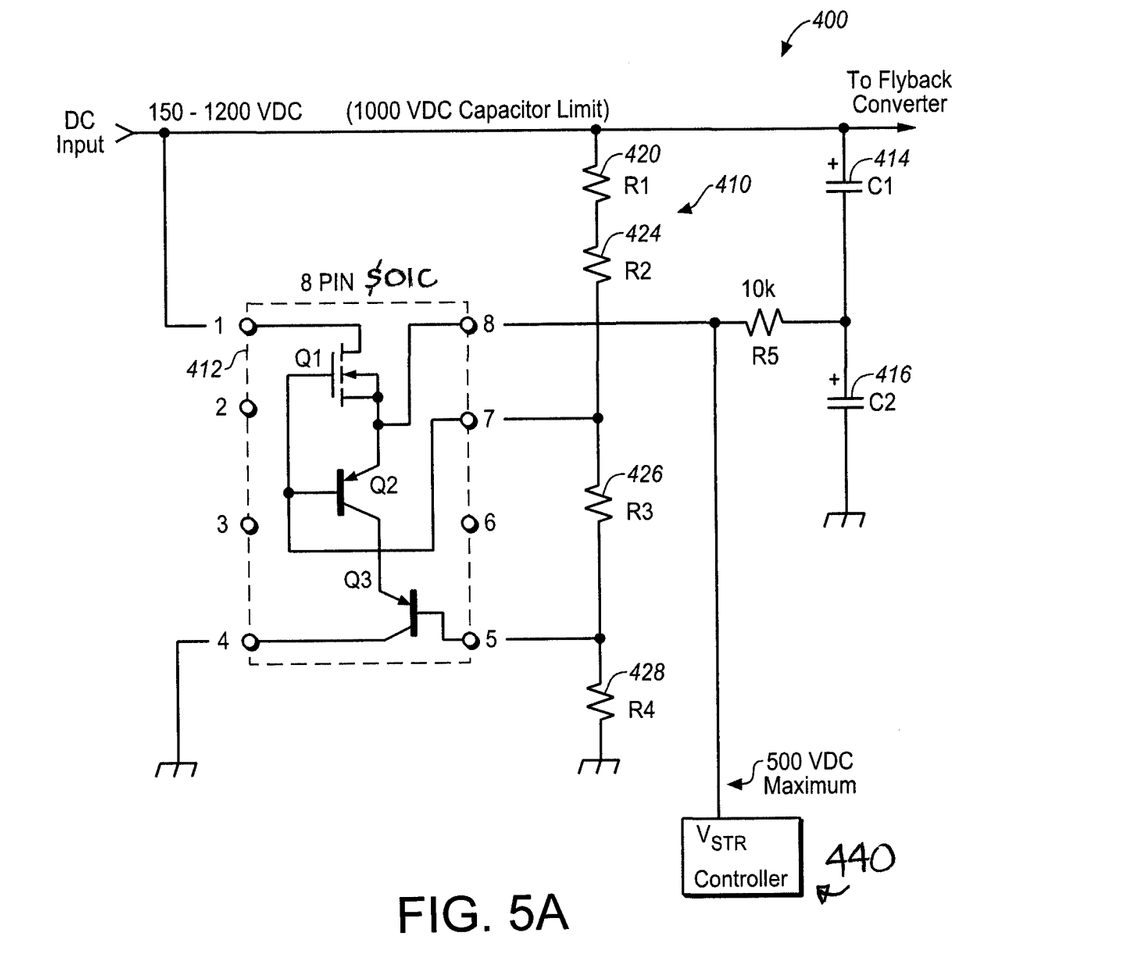
FIGS. 5A through 5G are schematic diagrams of exemplary implementations of a high voltage input capacitor balancing and startup circuit.
Figure 5B:
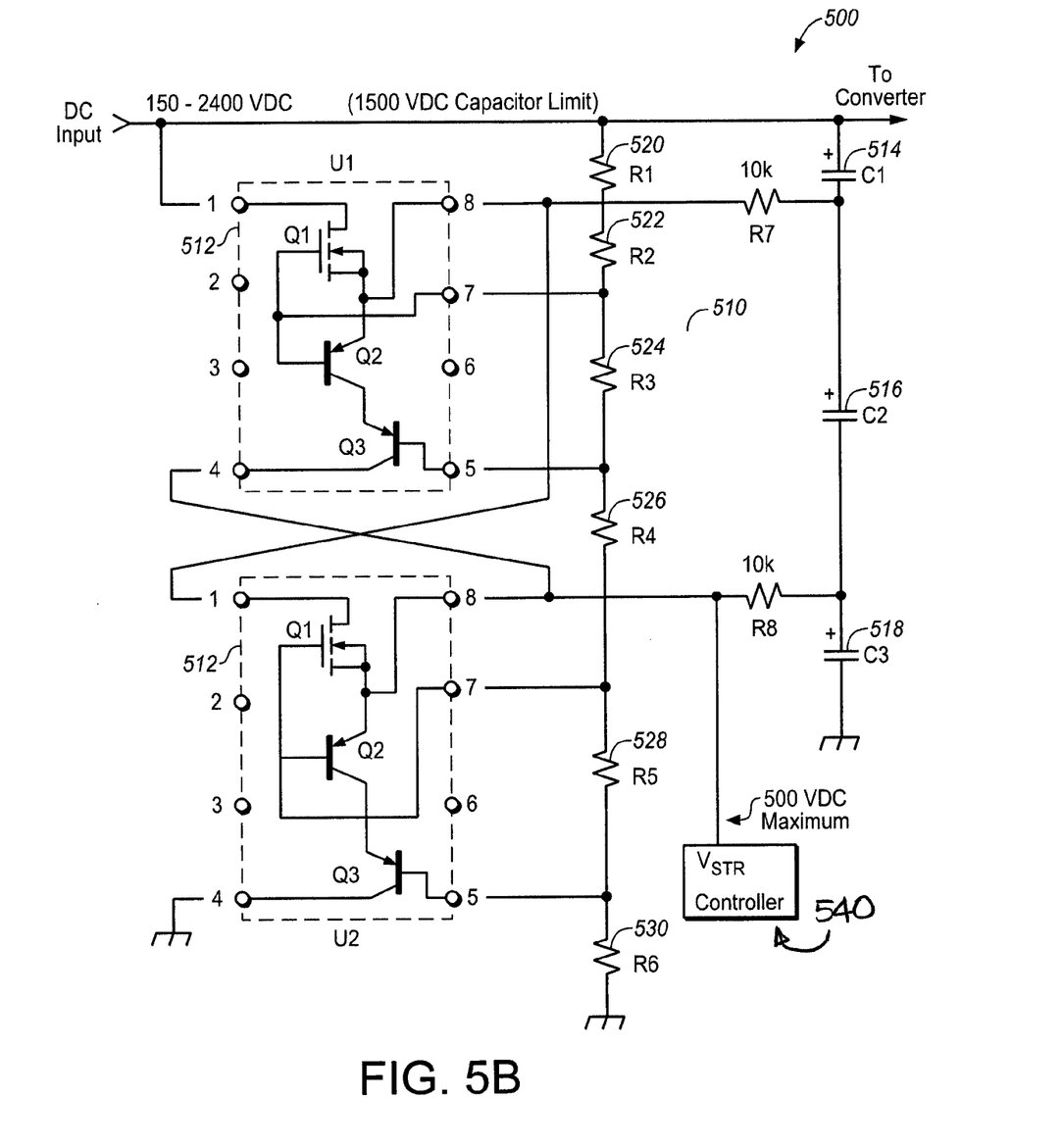

As shown, high voltage input capacitor balancing circuit 300 includes voltage divider 310 and an X1 ("times one") buffer 312. Voltage divider 310 can be set, for example, to be one-fifth to one-twentieth the normal required bleed current that would be used to directly balance the capacitors, given the values of capacitors 302 and 304 and their worst-case leakage current over time and temperature. In one embodiment, voltage divider 310 can be implemented with a plurality of resistors 320, 322 (also labeled as R1, R2) having values which provide the desired lower bleed current (e.g., one-fifth to one-twentieth the normal required bleed current). FIGS. 5A and 5B illustrate exemplary connection arrangements and configurations for the resistor divider 310 and X1 buffer 312. The output from buffer 312 can also be used to provide starting power to a power supply controller equipped with a HV startup provision.

Figure 3A:
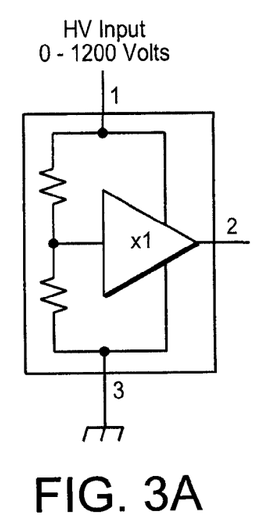
FIGS. 3A and 3B illustrate exemplary connection arrangements and configurations for the resistor divider and X1 buffer.
Figure 3B:
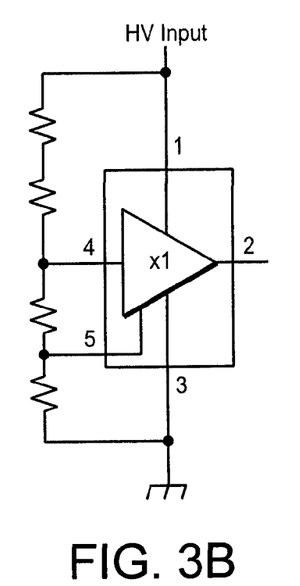

FIG. 3A and FIG. 3B are exemplary implementations of possible integrated circuits for performing or supporting the balancing and controller startup function. The circuit of FIG. 3A uses a single transistor or compound to provide the sink current to balanced capacitors. The circuit of FIG. 3B uses a stacked transistor or compound arrangement to provide the sink current.

Figure 4:
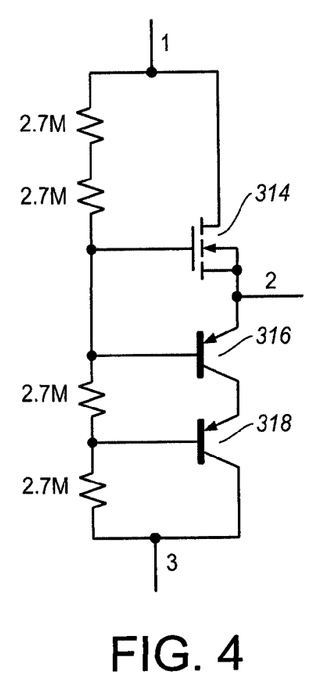
FIG. 4 is a schematic diagram of an exemplary implementation of an X1 buffer.

FIG. 4 is schematic diagram of an exemplary implementation of one possible X1 buffer 312 according to an embodiment of the invention. As shown, the X1 buffer 312 itself may include transistors 314, 316, and 318. In one embodiment, transistor 314 can be implemented with a MOSFET, such as a FQNIN60C, available from Fairchild Semiconductor Corp.; and each of transistors 316 and 318 can be implemented with a BJT, such as a KSP94, also available from Fairchild Semiconductor Corp. It should be understood, however, that transistors 314, 316, and 318 can be implemented with other suitable devices.

Referring to FIGS. 2-4, in operation, if input capacitors 302 and 304 have the same leakage currents by chance, that is, are balanced, the voltage on each capacitor would be the same, and no corrective current is required from high-voltage input capacitor balancing circuit 300 through resistor 320. Within the high voltage input capacitor balancing circuit 300, some current flows through the resistors 320, 322 of voltage divider 310 to establish voltage reference levels, but the amount of current will be relatively small as compared to a typical bleed current that would be required for passive balancing (which does not include the X1 buffer 312). In X1 buffer 312, the transistors 314, 316, and 318 are biased such that only leakage current typically flows through them from the voltage input to ground. Thus, the high voltage input capacitor balancing circuit 300 does not consume significant power when capacitors 302 and 304 are balanced. However, if capacitors 302 and 304 are not balanced, then the X1 buffer 312 provides current through resistor 309 to actively drive the capacitor balance. This current is sourced or sunk through transistor 314, 316, or 318, which is turned on by the voltage difference between the input voltage to the buffer established by voltage divider 310 (resistors 320 and 322), and the voltage on input filter capacitors common connection. If the buffer input is positive relative to the capacitor common voltage, 314 is tuned on. If the relative buffer input is negative, 316 and 318 are turned on and 314 remains off.

In addition, high voltage input capacitor balancing circuit 300 can also provide a buffered voltage equal to, for example, one-half the input voltage for a power supply controller equipped with a HV startup pin (e.g., switching controller 210 with VSTR pin as shown in FIG. 2). The MOSFET implementation for transistor 314 can provide extra drive for the high-voltage startup controller pin of the controller. In some embodiments, transistor 314 could be implemented using a high gain BJT such as a Darlington transistor. Transistors 316, 318 can be replaced by a single BJT or MOSFET, or combination thereof, provided they have suitable gain. Controllers with HV startup pins turn off the current draw after startup, and thus are very efficient. This, combined with the active balance circuit, can greatly improve power supply efficiency.

FIGS. 5A through 5G are schematic diagrams of exemplary implementations of a high voltage input capacitor balancing and startup circuit.

Referring to FIG. 5A, an exemplary implementation of a high voltage input capacitor balancing and startup circuit 400, according to an embodiment of the invention, can provide active balance for two input capacitor configuration (capacitors 414, 416 (also labeled C1, C2, respectively)) used as an input filter for a power supply. High voltage input capacitor balancing circuit 400 can also provide startup voltage for the controller 440 in the power supply.

As shown, high voltage input capacitor balancing circuit 400 includes voltage divider 410 and an X1 ("times one") buffer 412. In one embodiment, the X1 buffer 412 can be packaged in an SOIC (small-outline integrated circuit) package with 8 pins. Voltage divider 410 can be implemented with resistors 420, 424, 426, and 428 (also labeled R1, R2, R3, and R4, respectively) having values which provide the desired lower bleed current (e.g., one-fifth to one-twentieth the normal required bleed current).

FIG. 5B is a schematic diagram of an exemplary implementation of high voltage input capacitor balancing and startup circuit 500 according to an embodiment of the invention. High voltage input capacitor balancing circuit 500 can provide active balance for a three input capacitor configuration (capacitors 514, 516, and 518 (also labeled C1, C2, and C3, respectively)) used as an input filter for a power supply. High voltage input capacitor balancing circuit 500 can also provide startup voltage for the controller 540 in a power supply. As shown, high voltage input capacitor balancing and startup circuit 500 comprises a plurality of X1 ("times one") buffers 512, which are coupled to voltage divider 510 (implemented with resistors 520, 522, 524, 526, 528, and 530 (also labeled R1, R2, R3, R4, R5, and R6, respectively)).

Figure 5C:
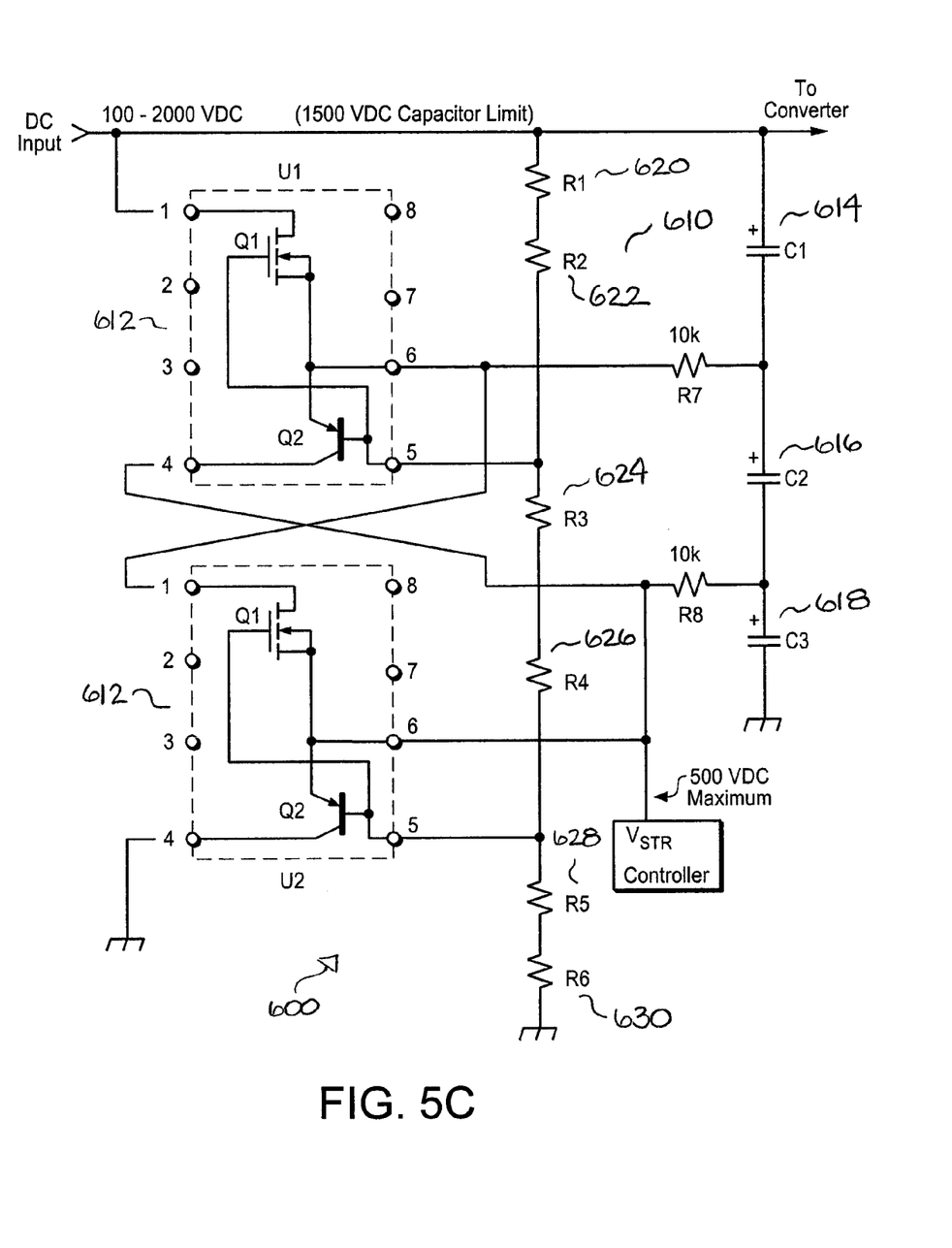
Figure 5D:
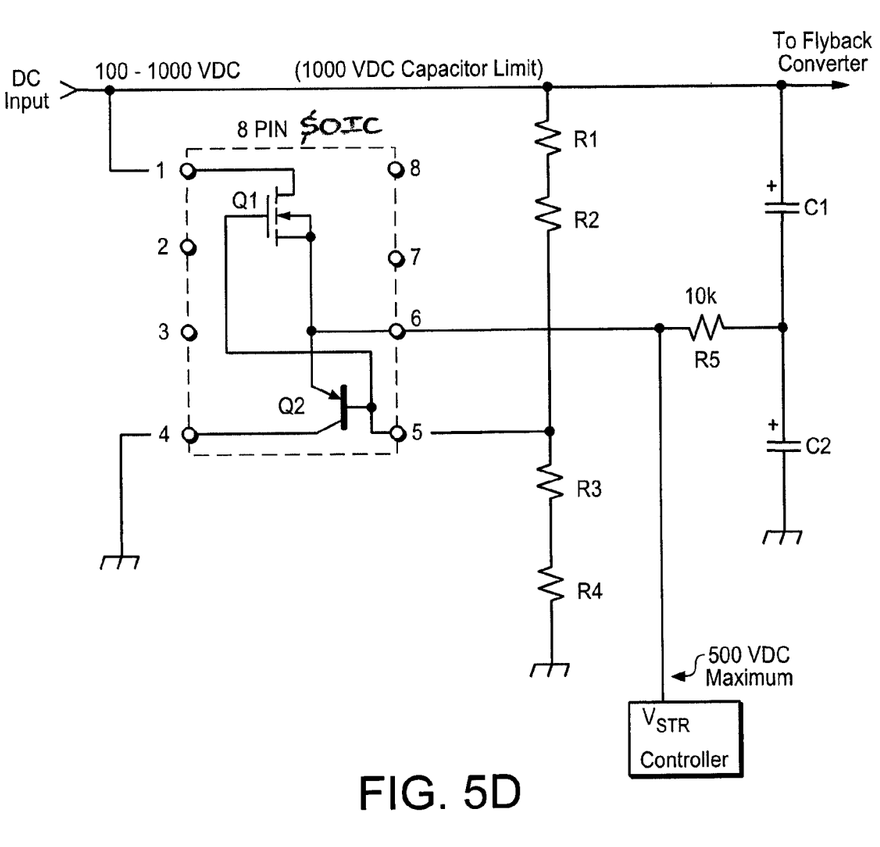
Figure 5E:
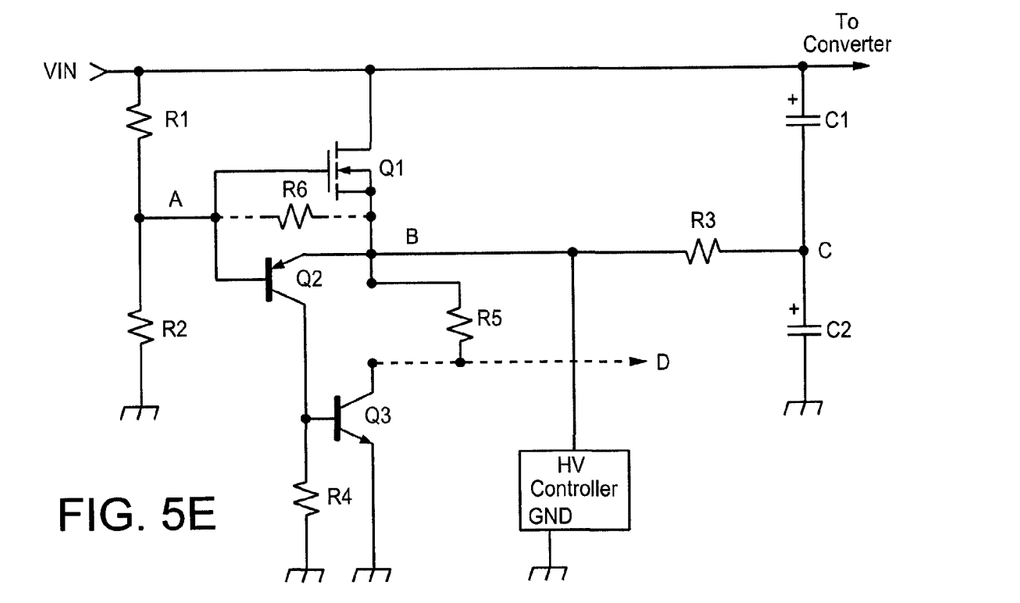
Figure 5F:
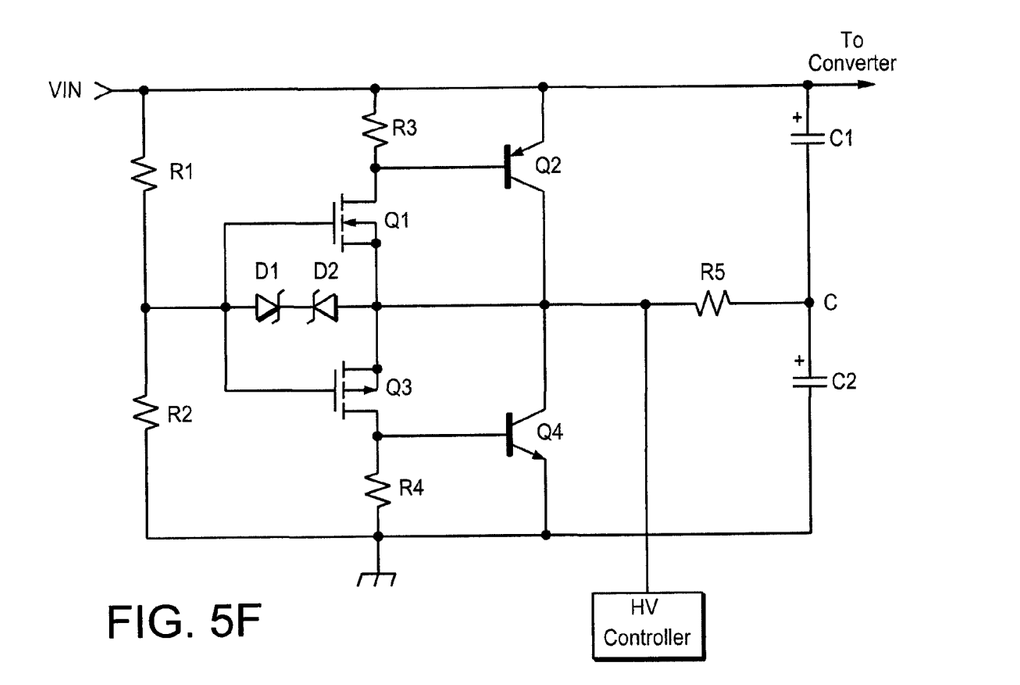
Figure 5G:
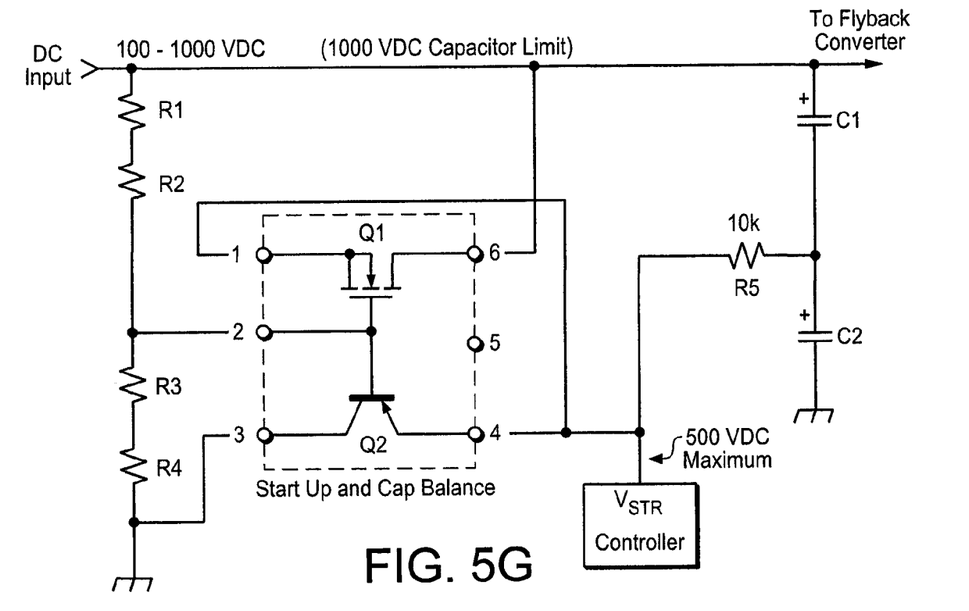

FIG. 5C illustrates, that components of, or multiple start up and balance circuits, can be stacked in a similar manner to the input capacitors to provide capacitor balance for any number of input capacitors or input voltage. For example, in one embodiment, four input capacitors would require three start up and balance circuits in stacked arrangement. Six input capacitors would require five stacked start up and balance circuits. In general, for M number of input capacitors, M−1 number of start-up and balance circuits may be provided.

As shown, high voltage input capacitor balancing circuit 600 includes voltage divider 610 and two X1 ("times one") buffers 612. In one embodiment, each X1 buffer 612 can be packaged in an SOIC package with 8 pins. The X1 buffer 612 can be stacked to balance input capacitors 614, 616, and 618 (also labeled C1, C2, and C3, respectively). Voltage divider 610 can be implemented with resistors 620, 622, 624, 626, 628, and 630 (also labeled R1, R2, R3, R4, R5, and R6, respectively) having values which provide the desired lower bleed current (e.g., one-fifth to one-twentieth the normal required bleed current).

From the foregoing, it is understood that active capacitor balancing is very useful in high-voltage low-power supplies where standby power is important. However, as power output gets larger so does the input capacitor value and the resultant leakage. From this, it can be seen that virtually any power supply can benefit if minimum load efficiency or overall power supply efficiency is important.

FIGS. 5D through 5G are schematic diagrams of further exemplary implementation of input capacitor balancing and startup circuits, according to embodiments of the invention.

Low Voltage Capacitor Balancing Circuit

Capacitive balancing may also be an issue at low voltages when using high capacitive value capacitors such as "Supercapacitors" or "Supercaps." Supercaps typically have voltage ratings typically below 6 volts, and so must be stacked to increase the voltage at which they can function. Additionally, low voltage capacitors, such as Supercaps, are very sensitive to over-voltage and thus must be balanced carefully. Finally, the energy storage capacity of such capacitors is very high so the resistive balancing methodology may be inappropriate especially during charge and discharge.

In one embodiment, low voltage capacitors are balanced without excessive bleed current, thereby increasing power supply efficiency. Such embodiment can reduce the traditional divider losses by up to 90% or more.

Figure 6:
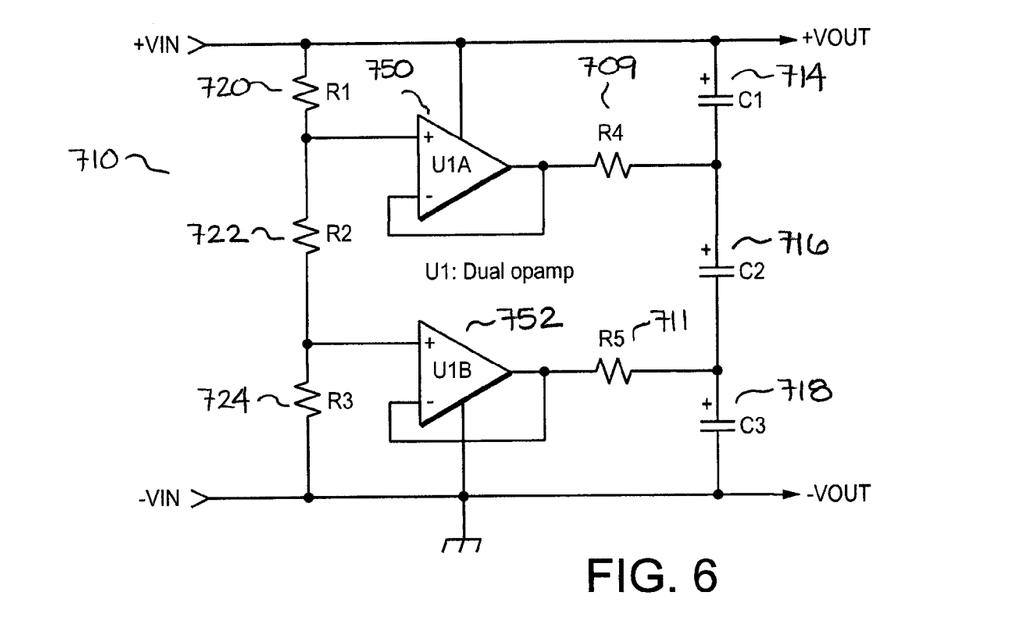
FIG. 6 is a schematic diagram of an exemplary implementation of a capacitor balancing circuit realized with an operational-amplifier.

FIG. 6 is a schematic diagram of an exemplary implementation of a possible supercapacitor balancing circuit employing operational amplifiers ("op-amps"). Such a circuit could be used or incorporated in a device, such as, for example, smart meter output voltage storage that is subject to, or used in, a wide range of applications. The circuit of FIG. 6. can be connected to a power source at an input terminal and operate with a wide range of input voltages, for example, approximately 6 to 20V DC. These balancing circuits can be stacked along with additional capacitors for higher voltage applications. Similar circuits can also be used at high voltages using appropriate op-amps, in which case, the operating voltages could range from 1 volt to more than 1000 volts.

As shown in FIG. 6, the circuit includes low voltage capacitors 714, 716, and 718 (also labeled C1, C2, and C3, respectively) in stacked arrangement. Each capacitor 714, 716, and 718 may have high energy storage capacity and relatively low voltage rating. These capacitors can each be implemented with a Supercapacitor. Resistors 720, 722, and 724 (also labeled as R1, R2, and R3, respectively) form a voltage divider 710 that (evenly) divides the input voltage VIN among the three stacked capacitors 714, 716, and 718. Resistors 709 and 711 (also labeled R4 and R5, respectively) limits the drive current provided to balance capacitors 714, 716, and 718. Operational amplifiers 750 and 752 (also labeled U1a and U1b, respectively), each of which can be implemented as a buffer amplifier (e.g., with approximately ×1 gain), provide the balancing current. With this arrangement, the low voltage capacitors 714, 716, and 718 can be used at higher voltages and in many applications where they previously could not be used.

Figure 7:
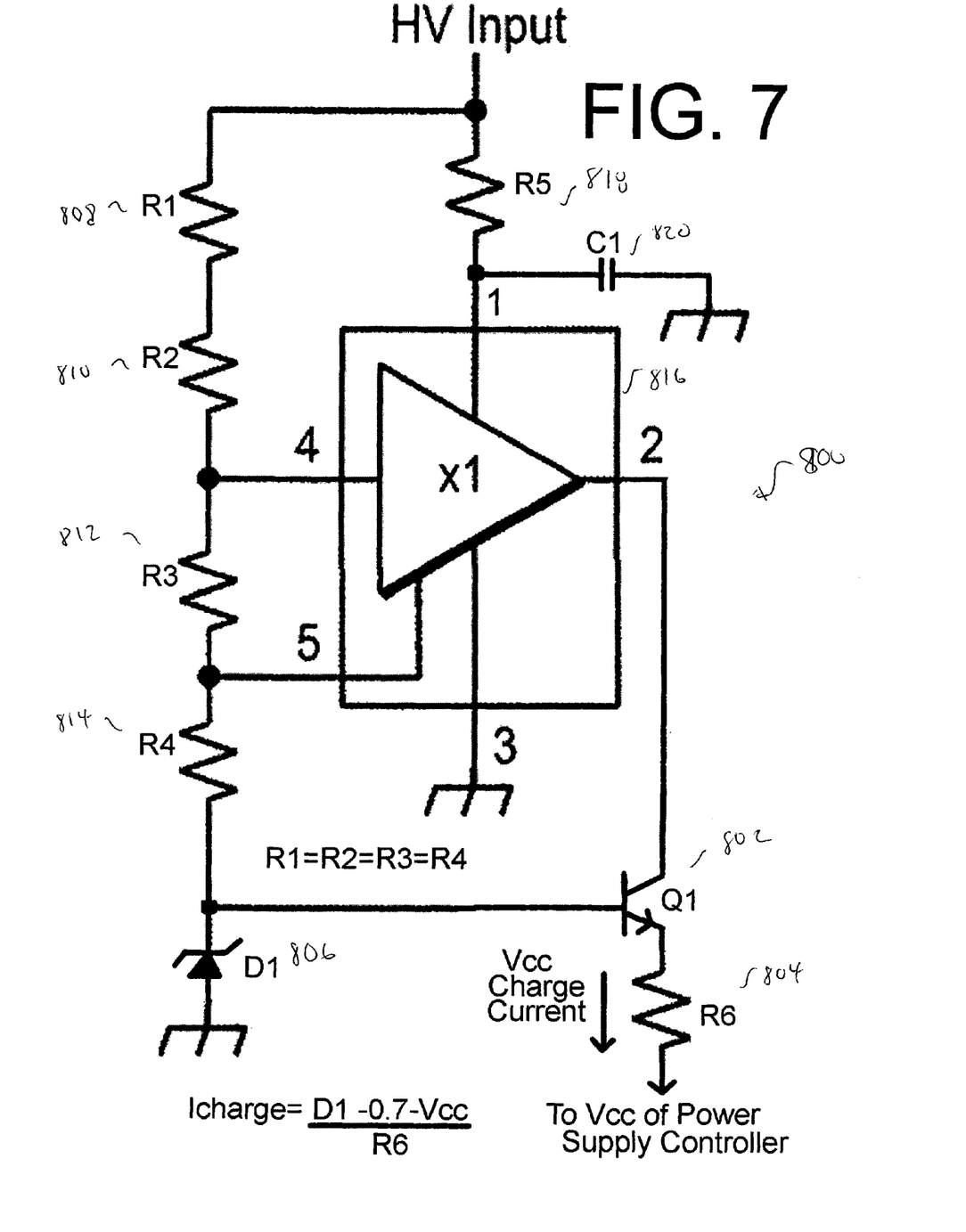
FIG. 7 is a schematic diagram of an exemplary implementation of a high voltage input capacitor balancing circuit.

FIG. 7 is a schematic diagram of an exemplary implementation of a high voltage input capacitor balancing circuit 800 according to an embodiment of the invention. FIG. 7 shows how to use the circuit to start a controller not equipped for high voltage (HV) start up. The circuit 800 is used to provide a buffered voltage which is approximately one-half of Vin to the collector of a transistor 802 (also labeled Q1), which in one embodiment (as shown) can be a BJT. The emitter of transistor 802 is connected to a resistor 804 (also labeled R6) which in turn is connected to the Vcc pin of a power supply controller. The base of transistor 802 is connected to a zener diode 806 (also labeled D1) and to the bottom of the chain of resistors 808, 810, 812, and 814 (also labeled R1, R2, R3, and R4, respectively). The top of the resistor chain is connected to Vin. Resistors 808 through 814 can be of equal value. Vin, less the voltage of diode 806, is divided across resistors 808-814 and provides an approximate midpoint value of Vin to pin 4 of the X1 buffer 816. The voltage at pin 5 of the buffer is roughly one fourth of Vin plus ¾ of the voltage on diode 806. Vin produces a current flow through the resistors 808-814 and the zener diode 806. The current drops voltage across the zener diode 806. This voltage is applied to the base of transistor 802. If the voltage at the base of transistor 802 is approximately 0.7 volts more positive than the voltage on Vcc, transistor 802 will turn on and charge the Vcc capacitor. The current through transistor 802 is limited by resistor 804. The maximum current is determined by the maximum voltage difference between the voltage at the emitter of transistor 802 divided by the value of resistor 804. When the voltage on Vcc is less than that required to cause the BJT to turn on, transistor 802 turns off. Normally, Vcc would be charged to a high enough voltage for the power supply controller to turn on. The action of the power supply would then supply the needed current to continue to charge and maintain Vcc. Thus, once the startup circuit has charged Vcc to a value sufficient for the controller to function, the start up circuit is no longer required during regular power supply operation. Resistor 818 (also labeled R5) and capacitor 820 (also labeled C1) limit the current to the X1 buffer 816 and provide protection from excessive dv/dt which might otherwise damage the buffer 816. Buffer 816 can be made up of any combination of suitable devices, such as BJTs, JFETs, MOSFETS, as understood by one of ordinary skill. The X1 buffer 816 as shown in FIG. 7 is one possible implementation for providing one half Vin to the transistor 802. As further understood by one of ordinary skill, this buffer might also be realized or implemented in other ways, such as a single BJT or MOSFET or a combination of BJTs and/or MOSFETs.

Although the present invention and its advantages have been described in detail, it should be understood that various changes, substitutions, and alterations can be made therein without departing from the spirit and scope of the invention. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function.

What is claimed is:

1. A circuitry for a power supply, comprising:
a controller of the power supply, the controller having a startup circuit; and
a startup and input capacitor balancing circuit for the power supply, the startup and input capacitor balancing circuit comprising:
an input capacitance operable to filter input power for the power supply, the input capacitance having a first capacitor and a second capacitor coupled in series between an input voltage and a first node and configured to filter the input voltage;
a voltage divider circuit coupled to the input voltage and operable to generate a divided voltage therefrom; and a buffer circuit operable to receive the divided voltage and, if the first capacitor and the second capacitor are not balanced, to provide current to the input capacitance to balance the first capacitor and the second capacitor, wherein the buffer circuit is operable to provide power for the startup circuit of the controller of the power supply.

2. The circuitry of claim 1, wherein the buffer circuit comprises at least a first transistor and a second transistor, each transistor having a control terminal coupled to the voltage divider.

3. The circuitry of claim 2, wherein the current provided by the buffer circuit is sourced through at least one of the first and the second transistors.

4. The circuitry of claim 2, wherein the first and the second transistors of the buffer circuit are turned on and off by a difference in voltages associated with the divided voltage and a common connection of the first capacitor and a second capacitor of the input capacitance.

5. The circuitry of claim 1, wherein the voltage divider circuit comprises at least a first resistor and a second resistor for dividing the input voltage.

6. The circuitry of claim 1, wherein the buffer circuit is operable to drive the input capacitance through a third resistor.

7. The circuitry of claim 6, wherein the third resistor is coupled at a second node between the first capacitor and a second capacitor.

8. A circuitry for a power supply, comprising:
   a controller of the power supply, the controller having a startup circuit; and
   a startup and input capacitor balancing circuit for the power supply, the startup and input capacitor balancing circuit comprising:
   M input capacitors coupled in series between an input voltage providing input power for the power supply and a first node, the M input capacitors operable to filter the input voltage;
   a voltage divider circuit coupled to the input voltage and operable to generate a plurality of divided voltages therefrom; and
   M-1 buffer circuits each coupled to a respective common connection between respective two of the M input capacitors, each of the M-1 buffer circuits operable to receive a respective divided voltage from the voltage divider circuit and, if the respective two of the M input capacitors are not balanced, to provide current to balance the respective two of the M input capacitors, wherein at least one of the M-1 buffer circuits is operable to provide power for the startup circuit of the controller of the power supply.

9. The circuitry of claim 8, wherein each of the buffer circuits comprises at least a first transistor and a second transistor, each of the first and second transistors having a control terminal coupled to the voltage divider.

10. The circuitry of claim 9, wherein the current provided by each buffer circuit is sourced through at least one of the respective first and the second transistors.

11. The circuitry of claim 10, wherein the first and the second transistors of each buffer circuit are turned on and off by a difference in voltages associated with the respective divided voltage and the respective common connection between the respective two of the M input capacitors.

12. The circuitry of claim 8, wherein the voltage divider circuit comprises a plurality of resistors for dividing the input voltage.

13. The circuitry of claim 8, wherein each buffer circuit is operable to drive the capacitance through a respective resistor coupled between the buffer circuit and the respective common connection.

* * * * *